United States Patent [19]

Huggins et al.

[11] 4,313,914

[45] Feb. 2, 1982

[54] AUTOCLAVE TUNGSTATE UPGRADING OF SCHEELITE CONCENTRATES

[75] Inventors: Dale K. Huggins; Paul B. Queneau, both of Golden; Leo W. Beckstead, Arvada, all of Colo.

[73] Assignee: Amax Inc., Greenwich, Conn.

[21] Appl. No.: 225,909

[22] Filed: Jan. 19, 1981

[51] Int. Cl.³ .............................................. C01G 41/00
[52] U.S. Cl. ........................................ 423/58; 423/61; 423/593; 423/53
[58] Field of Search ...................... 423/53, 58, 61, 593; 75/97 R, 121

[56] References Cited

U.S. PATENT DOCUMENTS

| | | | |
|---|---|---|---|
| 1,293,402 | 2/1919 | Giles | 423/58 |
| 1,796,026 | 3/1931 | Iredell | 423/58 |
| 2,459,868 | 1/1949 | Bunnell et al. | 423/58 |
| 4,278,644 | 7/1981 | Rappas et al. | 423/58 |

FOREIGN PATENT DOCUMENTS

| | | | |
|---|---|---|---|
| 457965 | 7/1949 | Canada | 423/58 |
| 607641 | 10/1960 | Canada | 423/61 |

*Primary Examiner*—Herbert T. Carter
*Attorney, Agent, or Firm*—Michael A. Ciomek; Donald T. Black

[57] ABSTRACT

A calcium tungstate concentrate is produced by slurrying an aqueous sodium tungstate liquor with calcium carbonate at about 130° C. to about 200° C. while providing sufficient carbon dioxide overpressure to convert sodium carbonate in the slurry to sodium bicarbonate, wherein the conversion of sodium tungstate to solid calcium tungstate in the slurry is promoted. The carbon dioxide is then stripped from the slurry, causing the sodium bicarbonate to convert to sodium carbonate, and a calcium tungstate concentrate is filtered from the slurry. The invention is useful in upgrading impure calcium tungstate concentrates.

19 Claims, No Drawings

AUTOCLAVE TUNGSTATE UPGRADING OF SCHEELITE CONCENTRATES

BACKGROUND OF THE INVENTION

1. Field of the Invention

The present invention relates to producing upgraded calcium tungstate concentrates from solid, impure calcium tungstate-bearing material such as concentrates, and also relates to the production of a calcium tungstate concentrate from a sodium tungstate liquor such as a leach liquor produced by digestion of calcium tungstate-bearing material with aqueous sodium carbonate.

Calcium tungstate, $CaWO_4$, is one form in which tungsten is conventionally sold to consumers of tungsten. Typically, commercially acceptable calcium tungstate contains at least about 65 wt. % tungsten as $WO_3$, and contains no more than minor amounts of impurities such as copper, sulfur, phosphorus, bismuth and molybdenum.

Although calcium tungstate (as scheelite) is one of the major naturally occurring forms of tungsten, the calcium tungstate as found in nature is contaminated with gangue and impurities which greatly reduce the $WO_3$ content of the raw material. The gangue and impurities must be removed for the calcium tungstate to be a useful product. Concentration techniques such as froth flotation and gravity concentration are generally effective to separate the calcium tungstate from associated gangue, but some of the tungsten concentrates thus produced still contain only about 10 wt. % to 20 wt. % $WO_3$. Thus, it is still necessary to treat the concentrates to raise the $WO_3$ content. In addition, alkaline-based processes for the recovery of tungsten frequently generate an alkaline solution of sodium tungstate, and it is desirable to be able to treat such a solution to recover an upgraded calcium tungstate concentrate. There is still a need for an economical, efficient process for producing upgraded calcium tungstate concentrates, which should advantageously generate by-product or side streams which are themselves useful in the purification of tungsten.

2. Description of the Prior Art

One process that has been employed for upgrading calcium tungstate concentrates comprises adding hydrochloric acid to the concentrate to dissolve calcite ($CaCO_3$) and thereby raise the $WO_3$ content relative to the remaining solid material. This process is unsatisfactory because it consumes excessive quantities of expensive acid, and dissolves a portion of the tungstate from the feed material, necessitating an extra series of tungsten recovery steps to maintain the overall tungsten recovery at reasonable levels.

The conventional method to produce synthetic scheelite from the pregnant liquor generated by soda ash pressure leaching of off-grade scheelite concentrates involves neutralization of the excess sodium carbonate with $H_2SO_4$. Carbon dioxide is evolved, and sodium sulfate generated. Calcium chloride is then added to form a calcium tungstate precipitate plus sodium chloride waste liquor. This neutralization with $H_2SO_4$ is necessary to avoid precipitating calcium carbonate when the calcium chloride is added. Sulfuric acid is consumed, and excess sodium carbonate is converted to sodium sulfate instead of being recycled to the leaching operation. Furthermore, the presence of this substantial concentration of aqueous sodium sulfate results in coprecipitation of calcium sulfate. Sulfur contamination of the calcium tungstate precipitate results. Therefore, the precipitate is calcined with carbon at about 950° C. to reduce the calcium sulfate to calcium oxide plus $SO_2$ offgas. The contaminating sulfur thus leaves as $SO_2$.

This process is unsatisfactory because it consumes large quantities of sulfuric acid and calcium chloride, and because it generates large volumes of waste sodium sulfate and sodium chloride in solution which must be disposed of. Furthermore, it would be desirable to eliminate the calcining operation, with its associated sulfur oxide evolution.

As will be seen below, the process of the present invention is distinct from both of the foregoing processes. It utilizes the reverse of the typical alkaline leaching reaction under conditions of temperature and pressure such that calcium tungstate, rather than being consumed as might be expected, is produced.

SUMMARY OF THE INVENTION

Stated generally, the present invention is a process for producing a calcium tungstate concentrate, comprising (a) forming a slurry of calcium carbonate in an aqueous sodium tungstate liquor, (b) reacting the sodium tungstate in the liquor with the calcium carbonate at a temperature of at least about 130° C. to form sodium carbonate and solid calcium tungstate, while providing sufficient carbon dioxide overpressure to the slurry to convert sodium carbonate in the slurry to sodium bicarbonate and thereby promote the conversion of sodium tungstate to calcium tungstate, thereby forming a product slurry containing a sodium bicarbonate liquor and a solid calcium tungstate concentrate which can be recovered from the product slurry, and, (c) stripping carbon dioxide from the sodium bicarbonate liquor to convert sodium bicarbonate to sodium carbonate in solution and evolved carbon dioxide.

The present invention also comprises a process for treating an impure calcium tungstate concentrate to produce an upgraded calcium tungstate concentrate, comprising (a) leaching the impure calcium tungstate concentrate with an aqueous sodium carbonate leachant to form an aqueous sodium tungstate leach liquor, (b) filtering the leach liquor, (c) forming a slurry of calcium carbonate in the leach liquor, (d) reacting the sodium tungstate in the leach liquor with the calcium carbonate at a temperature of at least about 130° C. to form sodium carbonate and solid calcium tungstate in the slurry, while providing sufficient carbon dioxide overpressure to the slurry to convert sodium carbonate in the slurry to sodium bicarbonate and thereby promote the conversion of sodium tungstate to calcium tungstate, thereby forming a product slurry containing a sodium bicarbonate liquor and a solid calcium tungstate concentrate, (e) treating the product slurry to strip carbon dioxide from the sodium bicarbonate liquor, wherein sodium bicarbonate is converted to sodium carbonate in solution and evolved carbon dioxide, and to recover an upgraded calcium tungstate concentrate, and (f) recycling the sodium carbonate solution recovered in step (e) to step (a) to serve as at least a portion of the sodium carbonate leachant.

DETAILED DESCRIPTION OF THE INVENTION

As indicated, the present invention effectively recovers a solid calcium tungstate concentrate from an aqueous sodium tungstate liquor. The aqueous sodium tungstate liquor can be a leach liquor produced by sodium carbonate digestion of impure calcium tungstate-bearing material, including calcium tungstate concentrates which have been produced by froth flotation or gravity concentration techniques. The impure feed material, e.g. impure concentrates, contain less than about 65 wt. % $WO_3$, and typically contain less than about 20% $WO_3$.

In particular, the sodium tungstate leach liquor treated in the present invention can be produced in accordance with a process described in one of the following patent applications, filed on even date herewith, which are assigned to the assignee of the present application: "Autoclave Soda Digestion of Scheelite On-Line Feedback Control", Ser. No. 225,910; "Autoclave Soda Digestion of Refractory Concentrates", Ser. No. 225,913; and "Autoclave Soda Digestion of Scheelite Concentrates", Ser. No. 225,914. The disclosures of these patent applications are hereby incorporated by reference herein.

The sodium tungstate liquor, however formed, can have a tungsten content ranging from below 50 grams per liter (gpl) $WO_3$ up to the limit of solubility of sodium tungstate; advantageously, more efficient recovery of calcium tungstate is afforded when the tungstate content of the liquor is above about 100 gpl tungsten as $WO_3$. The sodium tungstate liquor can also contain sodium carbonate, typically in amounts of about 50 gpl to about 100 gpl. Operation at high combined concentrations of sodium tungstate and sodium carbonate can exceed the solubility limit of sodium bicarbonate. The mixed calcium tungstate-sodium bicarbonate precipitate can be freed of its sodium bicarbonate by repulping the calcium tungstate product with water.

The sodium tungstate liquor to be treated in accordance with the present invention can be preliminarily treated for removal of dissolved impurities, such as dissolved silica, phosphorus, copper and fluorine. Silica, and phosphorus-based and fluorine-based impurities can be removed from the aqueous sodium tungstate liquor in accordance with the process described in the patent application, filed on even date herewith and assigned to the assignee of the present application, which is entitled "Treatment of Sodium Tungstate Leach Liquor Containing Dissolved Silica, Phosphorus, and Fluorine Impurities", Ser. No. 225,903, which is incorporated herein by reference. Molybdenum impurities should be low in the pregnant liquor, because calcium molybdate will precipitate with calcium tungstate during autoclave treatment with carbon dioxide.

The sodium tungstate liquor should be filtered, if necessary, to remove solid material such as unleached solids or precipitated impurities. The liquor is then reacted with solid calcium carbonate under controlled conditions leading to conversion of sodium tungstate in the liquor to sodium bicarbonate solution and solid calcium tungstate. The amount of calcium carbonate to use is selected with reference to the amount of tungsten in the sodium tungstate solution, and should be high enough to provide a satisfactory yield of calcium tungstate, but not so high as to unduly dilute the calcium tungstate product with excessive amounts of unreacted calcium carbonate. An amount of calcium carbonate advantageously corresponding to about 1 to about 1.4 times the stoichiometric requirement based on the sodium tungstate content of the liquor, and more advantageously about 1.05 to about 1.2 times the stoichiometric requirement, is generally satisfactory. The calcium carbonate is advantageously supplied in a relatively pure form, such as calcite, marble, or chalk. A calcite-bearing calcium tungstate concentrate can also be used, preferably after impurities and gangue have been removed therefrom.

The calcium carbonate should be finely divided, to a degree permitting reaction of the calcium carbonate at a satisfactory rate, and slurried in the sodium tungstate liquor. The slurry is sealed in an autoclave or other suitable pressure reaction vessel, the temperature of the slurry is adjusted to about 130° C. to about 200° C., and carbon dioxide overpressure is provided to the slurry. Temperatures below about 130° C. are less advantageous because the rate of the reaction of the sodium tungstate with the calcium carbonate is unsatisfactory. Temperatures above about 200° C. promote instead the reverse of the desired reaction, i.e., promote the reaction of sodium carbonate with solid calcium tungstate to form soluble sodium tungstate and solid calcium carbonate, unless excessively high carbon dioxide pressures are employed requiring the use of more robust apparatus. Temperatures above about 200° C. also impede the conversion of sodium carbonate to sodium bicarbonate by the carbon dioxide overpressure. Temperatures between about 140° C. and about 180° C., and more advantageously, between about 140° C. and about 160° C., are effective in this regard.

The carbon dioxide overpressure provided to the slurry of sodium tungstate and calcium carbonate should be at least sufficient to convert sodium carbonate, which would normally be formed in the solid and/or aqueous phases of the slurry by the reaction of the sodium tungstate with the solid calcium carbonate, to sodium bicarbonate in the liquor. Conversion of the sodium carbonate in this manner greatly reduces the sodium carbonate concentration in the liquor. The conversion of sodium tungstate to calcium tungstate is thereby promoted; i.e. more sodium tungstate is converted to calcium tungstate than would be in the absence of the carbon dioxide overpressure, because the concentration of sodium tungstate present in the liquor when equilibrium is reached with the sodium carbonate is also greatly reduced. Higher carbon dioxide overpressure and lower temperature promote the conversion of the carbonate to the bicarbonate.

Advantageously, the amount of carbon dioxide overpressure provided to the slurry should be effective to convert substantial amounts of sodium carbonate to sodium bicarbonate in the liquor, thereby converting substantial amounts of sodium tungstate to calcium tungstate. While the amount of carbon dioxide overpressure will depend on the quantities of sodium tungstate and calcium carbonate in the initial slurry, and on the degree of sodium tungstate conversion and final product grade desired, the overpressure should advantageously be at least about 100 psi $CO_2$, and more advantageously at least about 300 psi $CO_2$.

By conducting the reaction in accordance with the foregoing description, at least about 80% of the tungstate in the slurry as sodium tungstate is converted to solid calcium tungstate. Advantageously, conversion of over about 90% and more advantageously over about 94% can readily be achieved. Reaction times generally fall in the range of about 1 to about 4 hours.

When the reaction has proceeded as long as desired, carbon dioxide is then stripped from the sodium bicarbonate liquor. The reactor vessel contains a product slurry of solid calcium tungstate and lesser amounts of calcium carbonate, slurried in a product liquor of sodium bicarbonate, also containing minor amounts of sodium tungstate. Stripping carbon dioxide from the liquor causes conversion of the sodium bicarbonate to sodium carbonate in the liquor. Carbon dioxide stripping can be attained by venting the reactor vessel, and is aided by boiling or sparging the sodium bicarbonate liquor with air, steam or some other gas. In general, venting the carbon dioxide also causes the product slurry to cool quickly, generally to below about 140° C. This is a particularly advantageous feature of the present invention since, despite the presence of substantial quantities of sodium carbonate and calcium tungstate in the product slurry, the temperature is so low that little, if any, tungstate is redissolved by the sodium carbonate. Then, while the product slurry temperature is maintained at below about 120° C., this slurry is filtered to provide a solid, upgraded calcium tungstate concentrate and an aqueous solution of sodium carbonate. Some residual sodium bicarbonate may be present, which can be converted to sodium carbonate by stripping with steam, air, or some other gas. In an alternative embodiment, the calcium tungstate product can be filtered from the product slurry prior to stripping carbon dioxide.

The upgraded calcium tungstate concentrate will generally contain at least about 65% $WO_3$, and typically at least about 70% $WO_3$, and will generally contain less than about 10% total impurities, primarily as calcium carbonate. Thus, the product calcium tungstate concentrate is considerably upgraded with respect to calcium tungstate-bearing feed material treated in accordance with this invention.

The aqueous sodium carbonate solution recovered following carbon dioxide stripping generally contains about 50 gpl to about 100 gpl of sodium carbonate and up to about 10 gpl of $WO_3$. As such, this solution can advantageously be recycled to serve as an aqueous leachant for leaching solid calcium tungstate-bearing material such as calcium tungstate concentrates. The aqueous sodium carbonate solution can be recycled and used as is, or it can comprise a portion of the leachant, in combination with additional makeup sodium carbonate. Sodium tungstate leach liquors produced using the recycled sodium carbonate as a leachant can be filtered, optionally processed for removal of impurities, and treated in accordance with the foregoing disclosure to recover an upgraded calcium tungstate concentrate therefrom.

In another highly advantageous embodiment of this invention, the carbon dioxide overpressure which is stripped from the product liquor can be recycled directly, advantageously under pressure, to another reactor containing a fresh slurry of a sodium tungstate liquor and calcium carbonate, thereby providing carbon dioxide overpressure to the fresh slurry for conversion of sodium carbonate formed therein to sodium bicarbonate. Recycling the vented carbon dioxide while it is still under pressure conserves energy which would otherwise be lost in releasing the carbon dioxide to the atmosphere and recompressing additional carbon dioxide. The overpressure can be provided to the fresh slurry entirely with the recycled carbon dioxide. Makeup carbon dioxide is also provided to the fresh slurry, so that the recycled carbon dioxide comprises a portion of the carbon dioxide provided to the fresh slurry.

The present invention is described in the following Examples, which should be understood as being illustrative and not limiting.

EXAMPLE 1

$CaCO_3$ (as precipitated chalk) was slurried for 2 hrs. in a closed autoclave with a sodium tungstate liquor which contained 84 gpl $WO_3$ and 70 gpl $Na_2CO_3$ in solution, and using 66% stoichiometric excess of $CaCO_3$. The effect of various reaction temperatures, on the percent conversion of $Na_2WO_4$ to solid $CaWO_4$, and on the $WO_3$ content of the solid $CaWO_4$, is set forth in Table I.

TABLE I

| Temp., °C. | $CO_2$ psi | % Conversion | % $WO_3$ in product |
|---|---|---|---|
| 140 | 450 | 92 | 64 |
| 150 | 450 | 96 | 66 |
| 160 | 450 | 94 | 66 |
| 170 | 400 | 93 | 66 |
| 180 | 400 | 91 | 65 |

EXAMPLE 2

$CaCO_3$ (66% excess) was slurried in a closed autoclave at 150° C. with a sodium tungstate liquor containing 84 gpl $WO_3$ and 70 gpl $Na_2CO_3$ in solution. The effect of various $CO_2$ overpressures on the percent conversion of $Na_2WO_4$ to $CaWO_4$ is set forth in Table II.

TABLE II

| $CO_2$, psi | Time, Hrs. | % Conversion |
|---|---|---|
| 150 | 2 | 83 |
| 300 | 4 | 89 |
| 450 | 2 | 96 |

EXAMPLE 3

Various amounts of $CaCO_3$ were slurried for 2 hrs. at 450 psi $CO_2$ overpressure and 150° C. in a sodium tungstate liquor containing 84 gpl $WO_3$ and 70 gpl $Na_2CO_3$ in solution. The effect of various amounts of $CaCO_3$ (given as percent in excess of the stoichiometric requirement based on the sodium tungstate content) on the percent conversion of $Na_2WO_4$ to $CaWO_4$, and on the grade of the $CaWO_4$ concentrate produced (as wt. % $WO_3$) is given in Table III.

TABLE III

| Excess $CaCO_3$, % | % Conversion | wt. % $WO_3$ in product |
|---|---|---|
| 0 | 91 | 78 |
| 5 | 96 | 78 |
| 16 | 94 | 77 |
| 33 | 96 | 74 |
| 66 | 96 | 66 |

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and appended claims.

What is claimed is:

1. A process for producing a calcium tungstate concentrate, comprising
   (a) forming a slurry of calcium carbonate in an aqueous sodium tungstate liquor,
   (b) reacting sodium tungstate in the liquor with calcium carbonate at a temperature of at least about 130° C. to form sodium carbonate and solid calcium tungstate, while providing sufficient carbon dioxide overpressure to the slurry to convert sodium carbonate in the slurry to sodium bicarbonate and thereby promote the conversion of sodium tungstate to calcium tungstate, thereby forming a product slurry containing a sodium bicarbonate liquor and a solid calcium tungstate concentrate which can be recovered from said product slurry and,
   (c) stripping carbon dioxide from the sodium bicarbonate liquor to convert sodium bicarbonate to sodium carbonate in solution and evolved carbon dioxide.

2. The process of claim 1 wherein the sodium tungstate and calcium carbonate are reacted in step (b) at about 130° C. to about 200° C.

3. The process of claim 1 wherein the carbon dioxide overpressure provided to the slurry is at least about 100 psi $CO_2$.

4. The process of claim 2 wherein the carbon dioxide overpressure provided to the slurry is at least about 100 psi $CO_2$.

5. The process of claim 3 or claim 4 wherein the carbon dioxide overpressure provided to the slurry is at least about 300 psi $CO_2$.

6. The process of claim 1, 2, 3, or 4 wherein the solid calcium tungstate concentrate produced contains at least about 65 wt. % tungsten as $WO_3$.

7. The process of claim 1 wherein in step (a) the sodium tungstate liquor is slurried with an amount of calcium carbonate equivalent to up to about 2 times the stoichiometric requirement based on the sodium tungstate content in the liquor.

8. The process of claim 1, 2, 3, or 4 further comprising recycling the carbon dioxide stripped in step (c) to make up at least a portion of the carbon dioxide overpressure provided in step (b).

9. The process of claim 1, 2, 3, or 4 wherein the sodium tungstate liquor is produced by leaching a calcium tungstate concentrate with an aqueous sodium carbonate leachant and is filtered.

10. A process for treating an impure calcium tungstate concentrate to produce an upgraded calcium tungstate concentrate, comprising
    (a) leaching the impure calcium tungstate concentrate with an aqueous sodium carbonate leachant to form an aqueous sodium tungstate leach liquor,
    (b) filtering the leach liquor,
    (c) forming a slurry of calcium carbonate in the leach liquor,
    (d) reacting the sodium tungstate in the leach liquor with the calcium carbonate at a temperature of at least about 130° C. to form sodium carbonate and solid calcium tungstate in the slurry, while providing sufficient carbon dioxide overpressure to the slurry to convert sodium carbonate in the slurry to sodium bicarbonate and thereby promote the conversion of sodium tungstate to calcium tungstate, thereby forming a product slurry containing a sodium bicarbonate liquor and a solid calcium tungstate concentrate,
    (e) heating the product slurry to strip carbon dioxide from the sodium bicarbonate liquor, wherein sodium bicarbonate is converted to sodium carbonate in solution and evolved carbon dioxide, and to recover an upgraded calcium tungstate concentrate, and
    (f) recycling the sodium carbonate solution recovered in step (e) to step (a) to serve as at least a portion of the sodium carbonate leachant.

11. The process of claim 10 wherein the sodium tungstate and calcium carbonate are reacted in step (d) at about 130° C. to about 200° C.

12. The process of claim 10 wherein the carbon dioxide overpressure provided in step (d) is at least about 100 psi $CO_2$.

13. The process of claim 11 wherein the carbon dioxide overpressure provided in step (d) is at least about 100 psi $CO_2$.

14. The process of claim 10 wherein the carbon dioxide overpressure provided in step (d) is at least about 300 psi $CO_2$.

15. The process of claim 10, 11, 12, or 13 wherein the impure calcium tungstate concentrate contains less than about 65 wt. % $WO_3$ and the upgraded calcium tungstate concentrate contains at least about 65 wt. % $WO_3$.

16. The process of claim 10 wherein the impure calcium tungstate concentrate contains less than about 20 wt. % $WO_3$.

17. The process of claim 10, 11, 12, 13 or 16 further comprising recycling the carbon dioxide stripped in step (e) to make up at least a portion of the carbon dioxide overpressure provided in step (d).

18. The process of claim 10 wherein step (e) the calcium tungstate concentrate is recovered by filtration after the carbon dioxide is stripped from the sodium bicarbonate liquor.

19. The process of claim 10 wherein in step (e) the calcium tungstate concentrate is recovered by filtration before the carbon dioxide is stripped from the sodium bicarbonate liquor.

* * * * *